Aug. 8, 1967
P. C. McSHANE
3,334,460
REFRACTORY BRICK WITH METAL PLATE BONDED
BY A CHLOROPRENE-PHENOLIC ADHESIVE
Filed Feb. 11, 1965
3 Sheets-Sheet 2
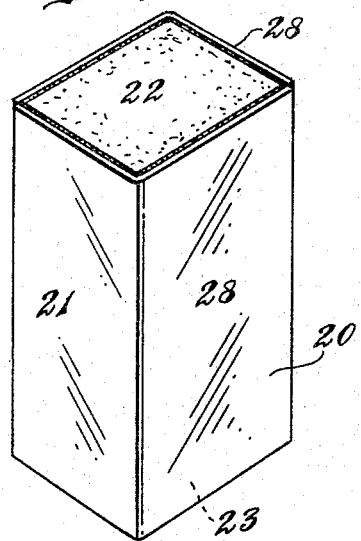
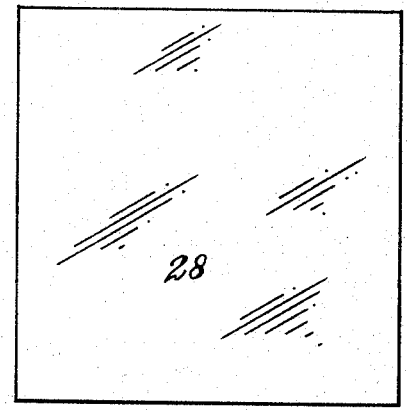
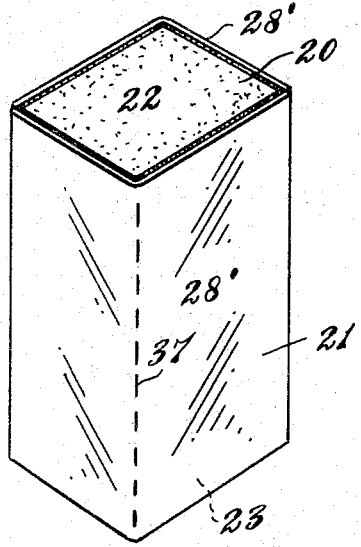
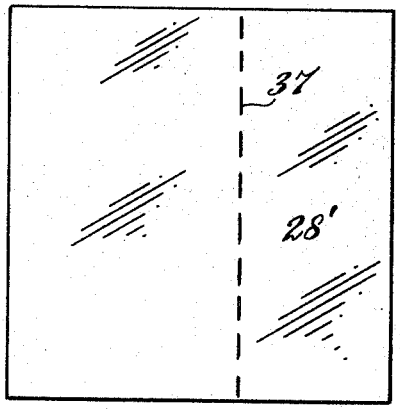
INVENTOR.
Philip C. McShane
BY
ATTORNEYS Aug. 8, 1967  P. C. McSHANE  3,334,460
REFRACTORY BRICK WITH METAL PLATE BONDED
BY A CHLOROPRENE-PHENOLIC ADHESIVE
Filed Feb. 11, 1965  3 Sheets-Sheet 3

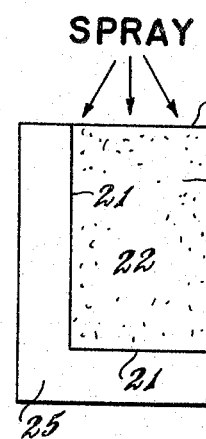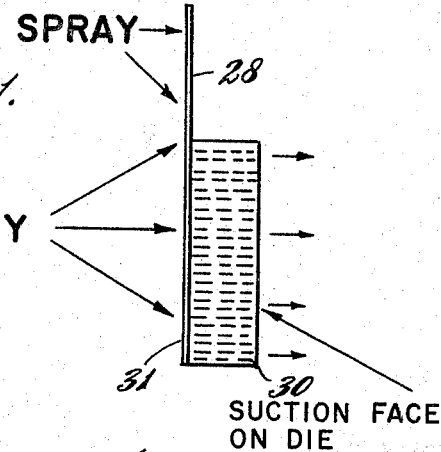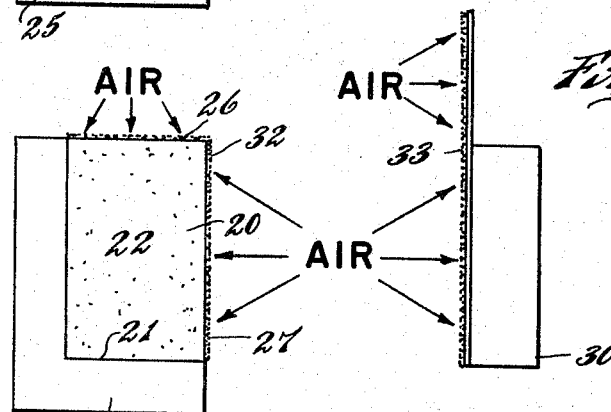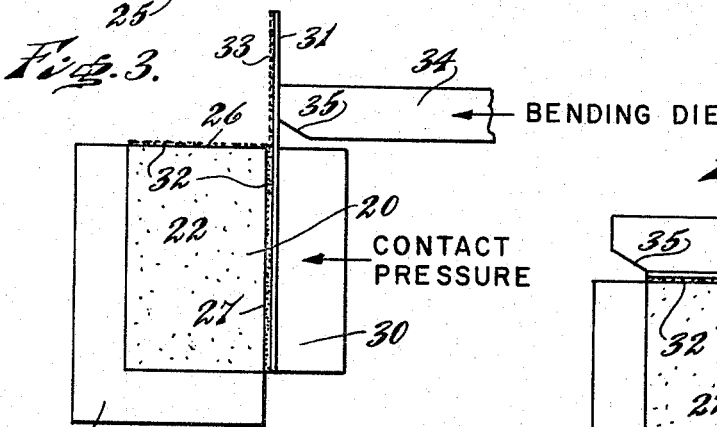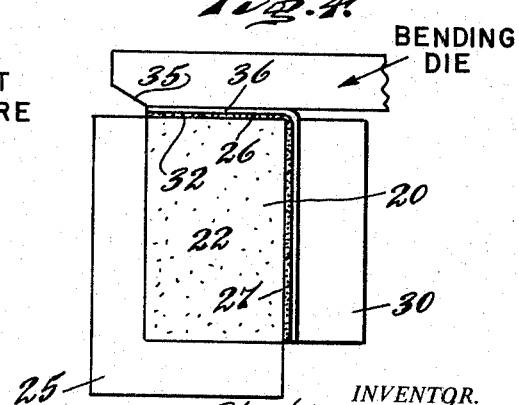

INVENTOR.
Philip C. McShane
BY
ATTORNEYS

United States Patent Office 3,334,460
Patented Aug. 8, 1967

3,334,460
REFRACTORY BRICK WITH METAL PLATE BONDED BY A CHLOROPRENE-PHENOLIC ADHESIVE
Philip C. McShane, Ellicott City, Md., assignor to General Refractories Company, Philadelphia, Pa., a corporation of Pennsylvania
Filed Feb. 11, 1965, Ser. No. 431,819
2 Claims. (Cl. 52—232)

The present invention relates to basic refractory bricks having oxidizable metallic plates and methods of making the same.

A purpose of the invention is to obtain effective bonding of an angle of oxidizable metallic plate to a corner and adjoining lateral faces of a basic refractory brick.

A further purpose is to secure an oxidizable metallic plate to a basic refractory brick by an adhesive which is not badly softened by heat, either during shipment, or during heating of the refractory brick in the initial stages of heating up a furnace lining.

A further purpose is to obtain more rapid bond development with freedom from tack in cementing oxidizable metallic plates to adjoining lateral faces of refractory bricks, so that the bricks can be handled and shipped immediately without danger of displacement of the plates on the bricks.

A further purpose is to use an adhesive which is less sensitive to the presence of dirt or oil on an oxidizable metallic plate.

A further purpose is to secure a plate to a basic refractory brick by applying a polychloroprene base contact adhesive over one surface of the plate and over adjoining lateral faces of the brick, allow the solvent to evaporate from the adhesive, and then to bring the plate which can still be flat with its contact adhesive surface in engagement with one of the lateral faces of the brick which is also coated with contact adhesive, next to bend the plate around the corner and against the corner and then bring the contact adhesive surface of the remainder of the plate into contact with the contact adhesive surface on the adjoining lateral face of the brick, thus assuring perfect conformity of the angle plate with the brick at the corner.

A further purpose is to weaken the plate at a position adjoining the corner, either by scoring or by forming a recess, and nevertheless to bend the plate around the corner in the manner previously described so that the formation of the plate at the corner will be controlled by the location of the corner.

A further purpose is to provide a recess in the plate at the corner to assist in removal of solvent from the adhesive.

A further purpose is to employ as an adhesive a polychloroprene base composition which may tend to liberate hydrochloric acid in aging, and to provide by the magnesia of the basic refractory brick an effective acid acceptor for the hydrochloric acid, above and beyond any acid acceptor already present in the adhesive composition.

A further purpose is to utilize a solvent type contact adhesive which forms a strongly adherent bond between the basic refractory and the oxidizable metal of the plate on mere evaporation of the solvent and brief aging at room temperature, the adhesive essentially consisting of polychloroprene and a normally solid phenol-aldehyde resin, the phenol-aldehyde resin consisting of an alkaline catalyzed condensation product of an aldehyde of the class consisting of formaldehyde and acetaldehyde and a monohydric phenol having only two particularly reaction favorable positions in the molecule and substituted only in the para position by a substituent from the group consisting of alkyl and aryl hydrocarbon radicals containing between 4 and 10 carbon atoms, the aldehyde being present in excess of 1:1 mol ratio in relation to the phenol, said phenol-aldehyde resin being present to the extent by weight of more than one-half that of the polychloroprene but not to a greater extent than twice that of said polychloroprene.

A further purpose is to utilize a resinous elastic contact adhesive which is capable of providing a tough, flexible, shock resistant and heat resistant layer firmly adherent to the basic refractory and to the oxidizable metal surfaces, essentially consisting of 50 to 200 parts by weight of polychloroprene and an interreacted mixture of 100 parts by weight of oil soluble heat hardening phenol-aldehyde resinous condensation product of formaldehyde and a substituted phenol aforesaid compatible with said polychloroprene and about 10 to 200 parts by weight of magnesium oxide, providing a reaction product of the phenol-aldehyde resin and magnesium oxide which is non-melting at the melting point of said phenol-aldehyde condensation product.

Further purposes appear in the specification and in the claims.

In the drawings I have chosen to illustrate a few only of the numerous embodiments in which the invention may appear, selecting the forms shown from the standpoints of convenience in illustration, satisfactory operation and clear demonstration of the principles involved.

FIGURE 1 is a diagrammatic illustration showing an early step of applying adhesive to the brick and to the plate, the view showing the brick in end elevation with a mold illustrated in section.

FIGURE 2 is a view similar to FIGURE 1, showing the drying of the adhesive by removal of solvent.

FIGURE 3 is a view similar to FIGURE 1, showing the adhesive attachment of the plate to one surface of the brick and the positioning of the bending die prior bending.

FIGURE 4 is a view similar to FIGURE 1, showing the bending die partially completing the operation of bending and applying the plate to the adjoining face of the brick.

FIGURE 5 is a perspective of a brick according to the invention having plates on all four lateral surfaces, produced according to the process of FIGURES 1 to 4.

FIGURE 6 is a plan view of a plain plate of the type which may be used in the process of FIGURES 1 to 4.

FIGURE 7 is a perspective of a brick according to the invention, having plates on all four lateral faces, the plates being scored at the points of joining.

FIGURE 8 is a plan view of a scored plate shown in FIGURE 7.

Figure 9:
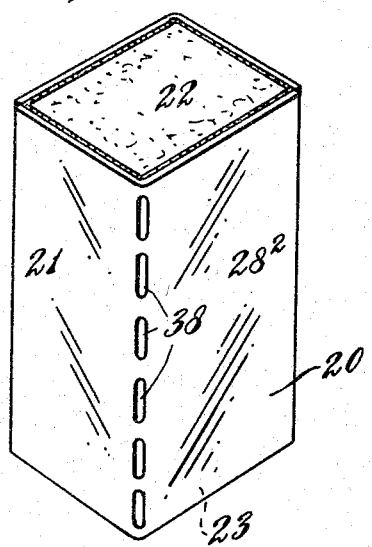
FIGURE 9 is a perspective of a brick according to the invention, having two plates on opposite pairs of adjoining lateral faces, the plates being lanced at the corners.
Figure 10:
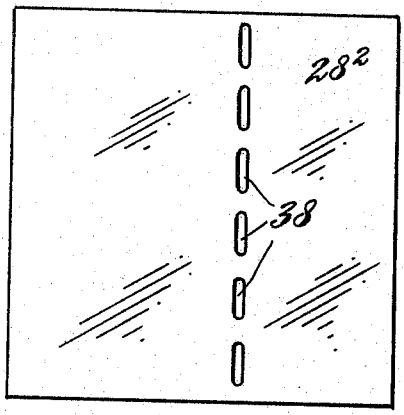
FIGURE 10 is a plan view of a lanced plate shown in FIGURE 9.

In the prior art, it has been very desirable in many cases to apply oxidizable metallic plates on the lateral faces of basic refractory bricks running from the hot end substantially to the cold end. These plates are usually of steel, and are usually of sheet gages, ordinarily in the range between 0.01" thickness and 3/16" thick. The oxidizable metallic plates undergo a chemical reaction with oxygen, producing oxides, and to some extent these oxides are capable of reacting with adjoining particles of magnesia of the basic refractory bricks, tending to bond together the bricks at the joints, seal the joints against leakage at the hot end and reduce spalling.

Where the bricks are not to be fired, but are bonded either by an adhesive or by some chemical bonding agent such as sulphuric acid, magnesium chloride, magnesium sulphate, or the like, it has been common practice to lance tabs or projections from the plates and to embed these in the refractory bricks by comolding.

Where, however, the basic refractory brick must be fired, the firing temperature is sufficiently high to melt steel plates, so it is not practical to apply the plates to fired bricks by comolding. Also in some cases even where bricks are not fired, it is preferable to adhesively secure plates on such unburned basic refractory bricks.

Considerable difficulty has been encountered in adhesively bonding plates to basic refractory bricks.

It will be evident, of course, that the basic refractory is porous and the adhesive to be effective must be capable of remaining on the surface. Also the basic refractory creates a highly basic environment, so that an adhesive which is damaged by such an environment cannot be used.

Furthermore, it is important that the adhesive should not be badly softened by temperatures slightly above atmospheric temperature. This is true in the first place because bricks are often shipped under conditions which may encounter elevated temperatures during summer shipment. In the second place, it is important that the adhesive at the cold end be effective until the refractory and the plate at the hot end have become very hot and have had an opportunity to undergo some reaction which will tend to prevent the plate from dropping out.

It is also important in many instances to be able to ship the bricks right after the plates are applied. Any adhesive, therefore, which tends to remain soft and tacky will present a problem because of the tendency of the plate to become displaced from the brick during initial handling and shipment. This difficulty has been encountered in the use of conventional rubber base adhesives, which remain tacky indefinitely and which set very slowly.

It will also be evident that there may be dirt, oil or oxide on the surface of the metal plates to at least a limited extent. If the adhesive is of such a character that the plates must be carefully degreased and cleaned in order for a good bond to be obtained, this is a serious objection. This difficulty has been encountered with prior rubber base adhesives.

These problems are greatly aggravated where the plate is of an angle formation intended to engage two adjoining lateral faces of the brick. It will be evident that in such a case, if the previously bent plate is brought in contact with one lateral face in such a way that the corner of the plate does not correctly align with the corner of the brick, either the resulting product will tend to have the plate deformed and not fully in contact with the brick at the corner, or else it will be necessary to break the first adhesion obtained in order to bring the plate into correct alignment with the corner. This is further complicated if the plate has not been precisely bent to the exact angle of the corner of the brick, because then the plate may tend to leave a space at the corner when both sides of the angle are brought into contact with the adjoining lateral faces of the brick. If it is necessary to bend the plate further to get good adherence, there may be difficulty caused by springback.

The present invention is concerned with overcoming these difficulties in applying a corner plate on a brick and particularly to secure precise conformity between the plate and the brick at the corner without any air space or bubble between the brick and the plate at this location.

The present invention contemplates applying the plate to the brick by a polychloroprene base contact adhesive which is of solvent type, the adhesive being previously applied to the surfaces of the plate and the brick which are to be bonded and the solvent previously having been given an opportunity to partially evaporate, preferably under heat.

The contact adhesive used in the present invention is not badly softened by heat and therefore withstands shipping temperatures encountered even in the desert in summer. It also holds the plates in place at the cold end until the hot end is hot enough to promote oxidation and reaction in starting up a furnace in which the bricks have been installed.

The contact adhesive of the invention develops a very strong bond in an extremely short time without residual tack. If the brick with the plate applied is run through an oven at a temperature of say 160° F. the bond effectively sets in about one minute and a half. The bond also will set at room temperature in about 10 minutes.

The penetration of the porous refractory is so limited that the bond is effective on the face of the refractory brick after applying only a single layer of adhesive.

The contact adhesive used in the present invention is not sensitive to the presence of small amounts of oil, dirt or oxide on the oxidizable metallic plates, so that the steel used need not be specially degreased.

The presence of the magnesia creates a favorable chemical environment for the contact adhesive since it can react with any hydrochloric acid produced and not interreacted with by the acid acceptor, if any, included in the adhesive.

The invention lends itself particularly well to precisely determining the position of the corner because the plate can be applied flat and bent around the corner either by hand or mechanically in applying the adhesive coated plate to the adhesive coated brick.

If the gage of the steel is heavy enough to present a difficulty in bending, this can be overcome either by scoring at a position opposite the corner or by lancing out a recess which will come adjoining the corner.

CONTACT ADHESIVE

The adhesive used in the present invention is a polychloroprene or neoprene base adhesive including a phenolaldehyde resin, dissolved in a suitable volatile solvent.

The adhesive is applied to the mating surfaces of both the plate and the refractory brick suitably by spraying, although it can be brushed on if desired.

I prefer to use an adhesive of the type described in Thompson U.S. Patent 2,610,910, granted Sept. 16, 1952, for Neoprene-Phenolic Adhesive Cement, or Gerrard and Mattson U.S. Patent 2,918,442, granted Dec. 22, 1959, for High Strength Heat Resistance Neoprene-Phenolic Adhesive Cement. Both of these patents are incorporated herein by reference.

The adhesive has very high early strength, much better than the usual rubber base adhesives.

It is important to use a phenol-aldehyde resin of the type herein described.

In one embodiment of the contact adhesive used in the present invention, the phenol-aldehyde resin consists of a condensation product of a phenol substituted in the para position by a substituent having between 4 and 10 carbon atoms in an alkyl or aryl group and an aldehyde of the class of formaldehyde or acetaldehyde. In order that the phenol-aldehyde resin shall be of the required reactive type the aldehyde should be present in an excess of 1:1 mol ratio in relation to the phenol and the condensation reaction to produce the phenol-aldehyde resin should be carried out in the presence of an alkaline catalyst such as sodium hydroxide, potassium hydroxide, ammonium hydroxide, sodium carbonate or the like. The condensation reaction is not carried to completion, leaving the resin of intermediate molecular size, but the condensation reaction is carried far enough to produce a solid resin at ordinary room temperatures. The phenol should have only two particularly reaction favorable positions in the molecule unoccupied. Examples of such a phenol are para-tertiarybutyl phenol, para-tertiaryamyl phenol, para-phenyl phenol, and para-octyl phenol.

The excess of aldehyde over a 1:1 mol ratio of aldehyde to phenol is usually such as to get a molecular ratio of aldehyde to phenol within the range of 1.2 to 1 up to 1.6 to 1. The phenol-aldehyde resin should be present to an extent by weight in excess of one-half of that of the neoprene and at the other end of the range it should not be present to a greater extent than one and one-half to two times that of the neoprene. In the preferred embodiment the phenol-aldehyde resin should be present to an extent by weight of 60 to 90% of the neoprene. For best results the phenol-aldehyde should be present in a range of 65 to 85% by weight of the neoprene.

*Example 1*

Part A.—Polychloroprene base:     Parts by weight
  Polychloroprene (neoprene) _____ 500
  Phenyl-alpha-naphthylamine (antioxidant) ____ 10
  Extra light calcined magnesia _____ 20
  Zinc oxide _____ 25

Mill the polymer on a rubber mill until it forms a continuous sheet around the roll. Add the antioxidant and magnesia, and finally the zinc oxide. Remove from the mill, and cut into convenient size pieces for dissolving.

Part B.—Cement:     Parts by weight
  Base stock as prepared in part A _____ 100
  Para-tertiary butyl phenol formaldehyde resin__ 75
  Coumarone-indene resin (M.P. about 300° F.) _ 25
  Toluol _____ 350

Dissolve the resins, then the freshly prepared base stock, in the toluol in a churn type mixer, solids content 22%.

Neoprene Type CG is a preferred polychloroprene or neoprene polymer. However, other types of chloroprene polymers, such as Neoprene Type E or Type GN, may also be used. In general neoprene polymers are preferred which (in the absence of milling) have a relatively high durometer hardness value.

A good commercial example of the phenol aldehyde resin above given is "Super-Beckacite #1003," a product of Reichhold Chemicals, Inc., Ferndale, Mich. It is a 100% phenol-formaldehyde resin, produced by condensing in excess of 1 mol of formaldehyde with 1 mol of paratertiary butyl phenol, in the presence of an alkaline catalyst, to provide a resin, solid at room temperatures (e.g. melting, when first heated, at 155° to 180° F.) and soluble in alcohols, acetates, coal tar solvents, turpentine and drying oils. The mol ratio of formaldehyde to phenol is, in general, between 1:1 and 2:1, and about 1.5 to 1 is an example of a good ratio.

It will be noted that the magnesia present in the adhesive composition itself is desirable to react with the small amounts of hydrochloric acid formed by breaking down the neoprene under aging.

The preferred solvent for the contact adhesive employed in the invention is toluene or benzene, although various aromatic hydrocarbons, chlorinated hydrocarbons and petroleum solvents containing high percentages of aromatic or naphthelenic substituents may be used.

The preferred embodiment of the contact adhesive employed in the present invention is exceptionally high in strength, resistant to heat and rapid in setting as set forth in said Gerrard and Mattson patent above referred to. These adhesives normally contain up to 5% by weight of an acid acceptor such as magnesium oxide. A suitable example of such a material is as follows:

*Example 2*

| Component | Parts by Weight (based on 100 parts neoprene) | Parts by Weight (based on 100 parts phenolic resin) |
|---|---|---|
| Polychloroprene (neoprene Type "CG") | 100 | 100 |
| Light calcined magnesia | 4 | 4 |
| Potassium hydroxide | 4.5 | 4.5 |
| Zinc oxide (optional) | 5 | 5 |
| Sodium acetate (optional) | 1 | 1 |
| Phenolic resin ("Super-Beckacite 1003") | 100 | 100 |
| Cumarone resin ("Cumar W") (optional) | 30 | 30 |
| Toluol | 400 | 400 |
| Ethyl alcohol | 8 | 8 |
| Water | 4.5 | 4.5 |

The magnesia, zinc oxide and sodium acetate are milled into the polymer on a rubber-mill. The resins are dissolved in the solvents in a paddle type mixer, and the milled base is then added in small pieces and dissolved. The potassium hydroxide is added as a solution in a minimum amount of either water or alcohol, and may be added to the solution either before or after the addition of the milled base. A rather heavy, viscous solution is obtained, which can be spread or brushed out to a smooth thin film. In the Fisher softening point test, test specimens prepared with this adhesive did not fail at the maximum test temperature of 163° C. The adhesive develops excellent adhesion to smooth metal or lacquered metal surfaces when coated and dried thereon.

The "Super-Beckacite 1003" is an example of an oil-soluble heat-hardening phenolic resin fully compatible with the neoprene in the proportions used, and produced by reaction, in the presence of an alkaline catalyst, of formaldehyde with less than an equal mol proportion of a substituted phenol. The specific resin named is produced with a monohydric phenol having only two particularly reaction favorable positions in the nucleus and substituted only in the para position by a side chain radical containing at least four carbon atoms, in this case being para-tertiary-butyl phenol.

In the above composition, the reaction product of the phenol-aldehyde resin and the alkaline additive is nonmelting at the melting point of the phenol-aldehyde condensation product prior to reaction with the alkaline additive.

The phenolic resin is initially fully compatible with neoprene. After the reaction with the alkaline additive it is still compatible within the useful range of up to about 100 parts of resin on 50 parts of polychloroprene.

In the broader aspects of this feature of the invention, a suitable composition for the contact adhesive is as follows:

(1) About 50 to 100 parts by weight of polychloroprene.

(2) The interacted mixture of (a) 100 parts of oil soluble heat hardenable phenol-aldehyde resinous condensation product of formaldehyde and a substituted phenol compatible with said polychloroprene as above set forth and (b) about 10 to 200 parts of magnesium oxide.

In the practical application of the angle plate to the brick, a basic refractory brick containing at least 10% of magnesia and usually at least 50% of magnesia, with the balance refractory chrome ore, ordinarily fired at a suitable firing temperature of the order of at least 1500° C. and suitably cooled to room temperature is coated with a layer of contact adhesive of the character described by spraying it in a suitable solvent as mentioned, the solids content of the spray solution suitably being in the range of 5 to 35% by weight. Where the plates are to be on only two adjoining sides the contact adhesive is merely sprayed on these sides but where two sets of angle plates are to be applied to cover substantially all four sides then suitably all four sides are sprayed, permissibly at different times.

Substantially concurrently the side of the oxidizable metallic plate which is to be against the brick is likewise sprayed with the same contact adhesive. The thickness of the layers of contact adhesive obtained are suitably of the order of 0.001 to 0.020 inch, preferably about 0.007 inch.

Time is then allowed for the solvent to evaporate, preferably of the order of 10 minutes, although longer times up to one hour can be allowed for this purpose, or heating up to 125° F. will shorten the time to a few minutes.

Then the plate is brought into contact with the lateral faces of the brick which it is to engage. As soon as firm contact is established, immediate firm adhesion is obtained, and the parts of the joint cannot be later moved with respect to one another without disrupting the adhesion.

Once proper adhesion has been achieved, the bricks can be set aside to allow the remaining solvent to be evaporated at room temperature and this takes place very quickly. The adhesion between the plate and the brick is immediately strong enough so that the brick with the plates affixed can be thrown across the floor or dropped on the floor without any loss of adhesion.

In the preferred embodiment, however, the brick with the plates affixed is placed in an oven for about 90 seconds at a temperature at about 160° F. and this completes the accelerated aging process which would otherwise take place in a few minutes at room temperature.

Considering now the drawings in detail, one diagrammatically shown process for cementing the plates is shown in FIGURES 1 to 4, inclusive. A basic refractory brick 20 as shown has lateral side faces 21, a cold end face 22 and a hot end face 23. In FIGURES 1, 2, 3 and 4 the brick is supported with lateral faces resting in a support or mold 25 which holds the bottom and one side.

In FIGURE 1 adhesive is applied to an upper lateral face 26 and a side lateral face 27 by suitable sprays. An oxidizable metallic plate 28 as shown in FIGURE 6, long enough and wide enough to cover two adjoining lateral faces 26 and 27 is supported by a die 30 movable horizontally toward the brick, only the suction holding face of the die 30 being shown. The surface 31 of the plate is coated with the same adhesive as by suitable sprays shown.

In FIGURE 2 the adhesive layers 32 on the brick and 33 on the plate are allowed to evaporate solvent as by suitable sprays of warm air which may to advantage be heated.

FIGURE 3 shows the die 30 carrying the plate 31 having its adhesive surface 33 brought in contact with the adhesive surface 32 on the vertical lateral face of the brick. A bending die 34 progressing horizontally from right to left is just engaging the plate above the level of the brick, the bending die having a tapered or filleted nose 35 to guard against damage to the plate as it is bent around the brick corner.

FIGURE 4 shows the bending die progressing so as to bend the plate at 36 so as to bring the adhesive layer 33 of the plate into firm adhesion with the corresponding layer 32 on the upper lateral face of the brick.

In FIGURE 5 a completed brick is shown having one plate 28 covering two adjoining lateral faces and the adjoining corner and another plate 28 covering the opposite lateral faces and the adjoining corner of the brick. In this case as shown in FIGURE 6 the plate has no weakening opposite the corner.

FIGURE 7, however, shows a brick having plates 28' engaging opposite adjoining faces of the brick the plate being pre-scored opposite the corner at 37 to favor bending.

In FIGURE 9 the brick 20 has on opposite adjoining faces plates $28^2$ which are lanced to provide elongated openings at 38 at the corner which allow solvent to escape during subsequent aging of the adhesive.

Figure 11:
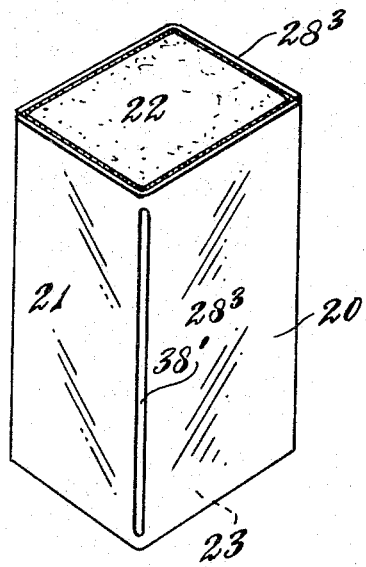
FIGURE 11 is a perspective of a brick according to the invention, having plates on opposed pairs of adjoining lateral faces, the plates being slotted at the corners.
Figure 12:
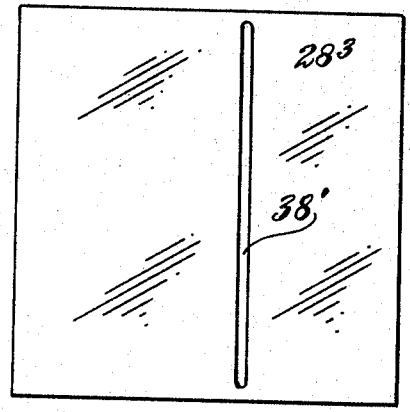
FIGURE 12 is a plan view of a slotted plate shown in FIGURE 11.

FIGURE 11 shows a brick having on opposite adjoining faces plates $28^3$ which are slotted to form an elongated slot 38' opposite the corner which further promotes escape of solvent especially during heating of the brick after the adhesive layers are brought into firm engagement with one another.

In tests made of angle plates affixed with the preferred adhesive of the invention, it was found that hot shearing strengths in bonds were obtained measuring the load in pounds required to push the angle plates applied to one 6 x 9 inch face and one 3 x 9 inch face with the following result:

HOT SHEARING LOAD IN POUNDS AT 80° F.

| Specimen No.: | Load |
| --- | --- |
| 1 | 1300 |
| 2 | 1470 |
| 3 | 830 |

HOT SHEARING LOAD IN POUNDS AT 275° F.

| Specimen No.: | Load |
| --- | --- |
| 1 | 860 |
| 2 | 550 |
| 3 | 510 |

HOT SHEARING LOAD IN POUNDS AT 350° F.

| Specimen No.: | Load |
| --- | --- |
| 1 | 360 |
| 2 | 220 |
| 3 | 640 |

The preferred contact adhesive used in the present invention is available on the market as Minnesota Mining and Manufacturing Company EC–2210.

It will be evident that of course the bricks may be provided with hanger attachments or hanger openings as required. The plates will preferably cover substantially all the lateral faces of the bricks, although where desired the plates need not run entirely to the cold end providing they cover the preponderant part of the lateral faces of the bricks.

In view of my invention and disclosure variations and modifications to meet individual whim or particular need will doubtless become evident to others skilled in the art, to obtain all or part of the benefits of my invention without copying the structure and process shown, and I therefore claim all such insofar as they fall within the reasonable spirit and scope of my claims.

Having thus described my invention, what I claim as new and desire to secure by Letters Patent is:

1. In a basic refractory brick combination, a basic refractory brick having a hot face, a cold face and lateral faces forming corners, an oxidizable metallic plate of angle formation having one side conforming to one of the lateral faces of the brick and another side conforming to another adjoining lateral face of the brick, extending around the corner between the adjoining lateral faces of the brick in close conformity with the refractory of the brick at the corner, and a contact adhesive bonding the refractory on each of said lateral faces to the metal of the plate adjoining the same by a strongly adherent bond, wherein the contact adhesive is a solvent type contact adhesive which forms a strongly adherent bond between the basic refractory and the metal of the oxidizable metallic plate on mere evaporation of solvent and aging at room temperature, said adhesive essentially consisting of chloroprene and a normally solid phenol-aldehyde resin, said phenol-aldehyde resin consisting of an alkaline catalyzed condensation product of an aldehyde of the class consisting of formaldehyde and acetaldehyde, and a monohydric phenol having only two particularly reaction favorable positions in the molecule and substituted only in the para-position by a substituent from the group consisting of alkyl and mononuclear aryl having from 4 to 10 carbon atoms, the aldehyde being present in excess of a 1:1 molecular ratio in relation to said phenol, said phenol-aldehyde resin being present to the extent by weight of more than one-half that of the polychloroprene but not to a greater extent than twice that of said polychloroprene.

2. In a basic refractory brick combination, a basic refractory brick having a hot face, a cold face and lateral faces forming corners, an oxidizable metallic plate of angle formation having one side conforming to one of the lateral faces of the brick and another side conforming to another adjoining lateral face of the brick, extending around the corner between the adjoining lateral faces of the brick in close conformity with the refractory of the brick at the corner, and a contact adhesive bonding the refractory on each of said lateral faces to the metal of the plate adjoining the same by a strongly adherent bond, wherein said contact adhesive essentially consists of a resinous elastic coating composition forming a tough, flexible, shock resistant, heat resistant layer which firmly adheres to the refractory and to the metal, essentially consisting of 50 to 200 parts by weight of polychloroprene interreacted with a mixture of 100 parts by weight of oil soluble heat hardening phenol-aldehyde resinous condensation product of formaldehyde and a monohydric phenol substituted only at the para-position by a substituent from the group consisting of alkyl and mononuclear aryl having from 4 to 10 carbon atoms and compatible with the polychloroprene, and about 10 to 200 parts by weight of magnesium oxide, providing a reaction product of the phenol-aldehyde resin and magnesium oxide which is non-melting at the melting point of said phenol-aldehyde condensation product.

References Cited
UNITED STATES PATENTS

| | | | |
|---|---|---|---|
| 2,915,893 | 12/1959 | Wilkins | 52—309 |
| 2,918,442 | 12/1959 | Gerrard | 260—29.3 |
| 3,086,330 | 5/1963 | Roudabush | 52—509 |

FOREIGN PATENTS

| | | |
|---|---|---|
| 926,115 | 1963 | Great Britain. |

JOHN E. MURTAGH, *Primary Examiner.*